(12) United States Patent
Tanner et al.

(10) Patent No.: US 11,570,453 B2
(45) Date of Patent: Jan. 31, 2023

(54) SWITCHABLE CHROMA SAMPLING FOR WIRELESS DISPLAY

(71) Applicant: Intel Corporation, Santa Clara, CA (US)

(72) Inventors: Jason Tanner, Folsom, CA (US); Paul S. Diefenbaugh, Portland, OR (US); Radhakrishnan Sankar, Cupertino, CA (US); Sang-Hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/920,046

(22) Filed: Jul. 2, 2020

(65) Prior Publication Data

US 2020/0374532 A1   Nov. 26, 2020

Related U.S. Application Data

(63) Continuation of application No. 15/180,972, filed on Jun. 13, 2016, now Pat. No. 10,771,795.

(51) Int. Cl.
*H04N 19/186* (2014.01)
*H04N 19/184* (2014.01)
(Continued)

(52) U.S. Cl.
CPC ......... *H04N 19/186* (2014.11); *H04L 43/106* (2013.01); *H04N 19/182* (2014.11); *H04N 19/184* (2014.11); *H04N 19/52* (2014.11)

(58) Field of Classification Search
CPC .. H04N 19/186; H04N 19/182; H04N 19/184; H04N 19/52; H04N 19/10;
(Continued)

(56) References Cited

U.S. PATENT DOCUMENTS

| 10,771,795 B2 | 9/2020 | Tanner et al. |
| 2005/0123058 A1 | 6/2005 | Greenbaum et al. |

(Continued)

OTHER PUBLICATIONS

United States Patent and Trademark Office, "Non-Final Office Action," issued in connection with U.S. Appl. No. 15/180,972, dated Sep. 17, 2019, 10 pages.
(Continued)

*Primary Examiner* — Maria E Vazquez Colon
(74) *Attorney, Agent, or Firm* — Hanley, Flight & Zimmerman, LLC

(57) ABSTRACT

Methods, apparatuses and systems may provide for a video transmitter that generates a primary bitstream based on a video signal, wherein the primary bitstream is encoded with subsampled chroma information, and detects a static condition with respect to the video signal. Additionally, a plurality of auxiliary bitstreams may be generated, in response to the static condition, based on the video signal. Each of the plurality of auxiliary bitstreams may be encoded with full resolution chroma information. In one example, a video receiver may detect that the auxiliary bitstreams are associated with the primary bitstream, decode the primary bitstream and the plurality of auxiliary bitstreams to obtain luma information and the full resolution chroma information, and multiplex the luma information with the full resolution chroma information.

19 Claims, 7 Drawing Sheets

(51) Int. Cl.
*H04N 19/52* (2014.01)
*H04L 43/106* (2022.01)
*H04N 19/182* (2014.01)

(58) Field of Classification Search
CPC .... H04N 19/156; H04N 19/164; H04N 19/46; H04N 19/59; H04L 43/106
See application file for complete search history.

(56) References Cited

U.S. PATENT DOCUMENTS

| | | |
|---|---|---|
| 2007/0116383 A1 | 5/2007 | De Haan |
| 2015/0304693 A1* | 10/2015 | Hwang ............ H04N 21/23439 725/116 |
| 2016/0212373 A1 | 7/2016 | Aharon et al. |
| 2017/0085895 A1 | 3/2017 | Gu et al. |

OTHER PUBLICATIONS

United States Patent and Trademark Office, "Final Office Action," issued in connection with U.S. Appl. No. 15/180,972, dated Mar. 10, 2020, 24 pages.

United States Patent and Trademark Office, "Notice of Allowance and Fee(s) due," issued in connection with U.S. Appl. No. 15/180,972, dated May 15, 2020, 7 pages.

Wikipedia, "Chroma subsampling", Wikipedia: the free encylcopedia, edited Apr. 26, 2016, 9 pages.

Schulzrinne et al., "Real Time Streaming Protocol (RTSP)", Standards Track, Apr. 1998, 85 pages, The Internet Society.

* cited by examiner

SWITCHABLE CHROMA SAMPLING FOR WIRELESS DISPLAY

CROSS-REFERENCE TO RELATED APPLICATION

This application is a continuation of U.S. patent application Ser. No. 15/180,972, entitled "SWITCHABLE CHROMA SAMPLING FOR WIRELESS DISPLAY," filed Jun. 13, 2016, the entire disclosure of which is hereby incorporated by reference herein.

BACKGROUND

Video systems may subsample color information in order to save video transmission time and reduce file size. Color subsampling, however, may result in noticeable visual artifacts for certain types of applications such as, for example, productivity applications in which the video contains text and other fine details.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
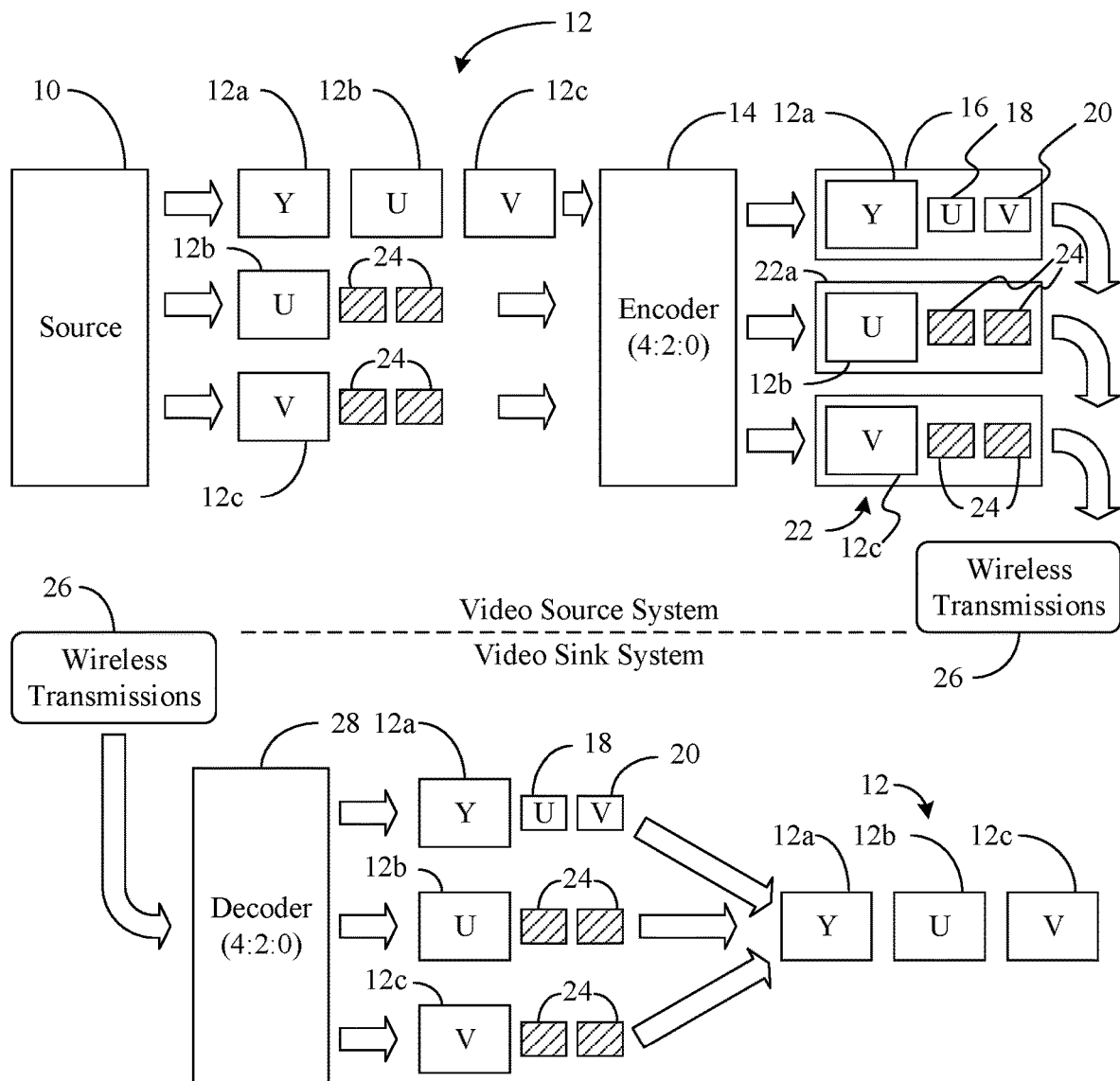
FIG. 1 is an illustration of a switchable chroma sampling solution according to an embodiment.

FIG. 1 shows a switchable chroma solution that may be used to wirelessly transfer video signals to a display (not shown). In the illustrated example, a video signal 12 (12*a*-12*c*) may be received from a source 10 (e.g., memory device, network controller, application) in a video source system such as, for example, a handheld device (e.g., tablet computer, convertible tablet, smart phone, personal digital assistant/PDA, mobile Internet device/MID, media player). The video signal 12 may generally be structured as luma information 12*a* ("Y" intensity), first chroma information 12*b* ("U" color, e.g., chroma blue/Cb information) and second chroma information 12*c* ("V" color, e.g., chroma red/Cr information). Because the human visual system is typically less sensitive to color changes than intensity changes, an encoder 14 may be used to compress the video signal 12 into a primary bitstream 16 that includes the full resolution luma information 12*a*, subsampled first chroma information 18 and subsampled second chroma information 20. For example, if the encoder 14 is configured to conduct "4:2:0" compression, the luma information would be sampled for each pixel, wherein one line of pixels would include Cb samples for every other pixel, and the next line of pixels would include Cr samples for every other pixel. Such an approach may avoid substantial deterioration in the quality of the video signal 12 from the perspective of a user, particularly when the video signal 12 contains relatively dynamic content (e.g., a movie).

The video signal 12 might include, however, relatively static content (e.g., non-changing text, web page, frame or graphical window containing a movie) as well as relatively dynamic content. Because color differences may be more detectable to the human eye in static content, the primary bitstream 16 may produce noticeable visual artifacts when static content is present in the video signal 12. Accordingly, the illustrated solution detects static conditions with respect to the video signal 12 and generates a plurality of auxiliary bitstreams 22 (22*a*, 22*b*) in response to the static conditions. For example, a first auxiliary bitstream 22*a* may include the first chroma information 12*b* at full resolution (e.g., Cb samples for each pixel) and a second auxiliary bitstream 22*b* may include the second chroma information 12*c* at full resolution (e.g., Cr samples for each pixel). The static conditions may be based on the entire frame being static, a majority of the frame being static, and so forth. Moreover, the static conditions may be based on one static frame or a certain threshold of static frames being detected. In one example, the static conditions are detected based on dirty rectangle information associated with the video signal 12, wherein the dirty rectangle information identifies static regions in one or more frames of the video signal 12. In such a case, the auxiliary bitstreams 22 may be restricted to the static regions of the frames (e.g., a subset of an entire frame).

The first auxiliary bitstream 22*a* may be generated by processing a pointer to the first chroma information 12*b* and a replicated constant value surface 24 (e.g., 128 grey) in the encoder 14 as luma information. Alternatively, the first chroma information 12*b* may be used to generate a monochrome video that is passed to the encoder 14. Similarly, the second auxiliary bitstream 22*b* may be generated by processing a pointer or monochrome video of the second chroma information 12*c* in the encoder 14 as luma information. The primary bitstream 16 and the auxiliary bitstreams 22 may be output as one or more wireless transmissions 26 (e.g., organized into one or more packets containing headers, payloads, etc.). Of particular note is that the static nature of the video signal 12 may reduce processing time and significantly reduce the bandwidth consumed by the wireless transmissions 26 even though the auxiliary bitstreams 22 are present in the wireless transmissions 26.

The wireless transmissions 26 may be received by a video sink system such as, for example, a wireless display, which may route the information from the wireless transmissions 26 to a decoder 28. The illustrated decoder 28 recovers the full resolution luma information 12*a*, the subsampled first chroma information 18 and the subsampled second chroma information 20 from the primary bitstream 16. The decoder 28 may also recover the first chroma information 12*b* (e.g., at full resolution) and the constant value surfaces 24 from the first auxiliary bitstream 22*a*. Similarly, the decoder 28 may recover the second chroma information 12*c* (e.g., at full resolution) and the constant value surfaces 24 from the second auxiliary bitstream 22b.

A determination may be made as to whether the information recovered from the auxiliary bitstreams 22 is associated with the information recovered from the primary bitstream 16. If so, the luma information 12a, the first chroma information 12b and the second chroma information 12c may be combined to form the original video signal 12 at full resolution (e.g., "4:4:4" resolution). In such a case, the subsampled first chroma information 18, the subsampled second chroma information 20 and the constant value surfaces 24 may be discarded. If, on the other hand, either the information recovered from the auxiliary bitstreams 22 is not associated with information recovered from primary bitstreams (e.g., over a certain time window) or no auxiliary bitstreams are received, the luma information 12a, the subsampled first chroma information 18 and the subsampled second chroma information 20 may be used to present the video signal 12 on a display of the video sink system.

As will be discussed in greater detail, process identifiers and timestamp information may be used to determine whether the auxiliary bitstreams 22 are associated with the primary bitstream 16. For example, the video source system might mark the first auxiliary bitstream 22a with a first process identifier (PID, e.g., in a program map table/PMT and/or program association table/PAT message), mark the second auxiliary bitstream 22b with a second PID and mark the primary bitstream 16 with a third PID, wherein the first, second and third PIDs are different from one another. The video source system may also incorporate shared timestamp information into one or more packets including portions of the primary bitstream 16 and the auxiliary bitstreams 22. In such a case, the video sink system may compare the received PID and timestamp information to detect the presence/use of the auxiliary bitstreams 22. The video source system may also use PMT/PAT stream type flags to signal the use of the auxiliary bitstreams 22 to the video sink system. Thus, the video sink system may transition seamlessly from 4:2:0 operation to 4:4:4 operation and back to 4:2:0 operation without halting playback. The video sink system and the video source system may also exchange auxiliary bitstream capability information beforehand, as will be discussed in greater detail.

At the start of the auxiliary bitstream frame transmission sequence, the frames may be intra coded (e.g., as I-frames). The delivery of the two I-frames may occur in one frame period or across multiple frame periods. Such an approach may be coordinated between the receiver and the transmitter. Extra time may be taken for transmission of the initial I-frames for performance or bandwidth reasons. Meanwhile, the original 4:2:0 stream may continue to be sent and received. Because the original 4:2:0 is static in such a case, minimal processing time and bandwidth may be involved while the auxiliary bitstream frame transmission is starting up.

Figure 2:
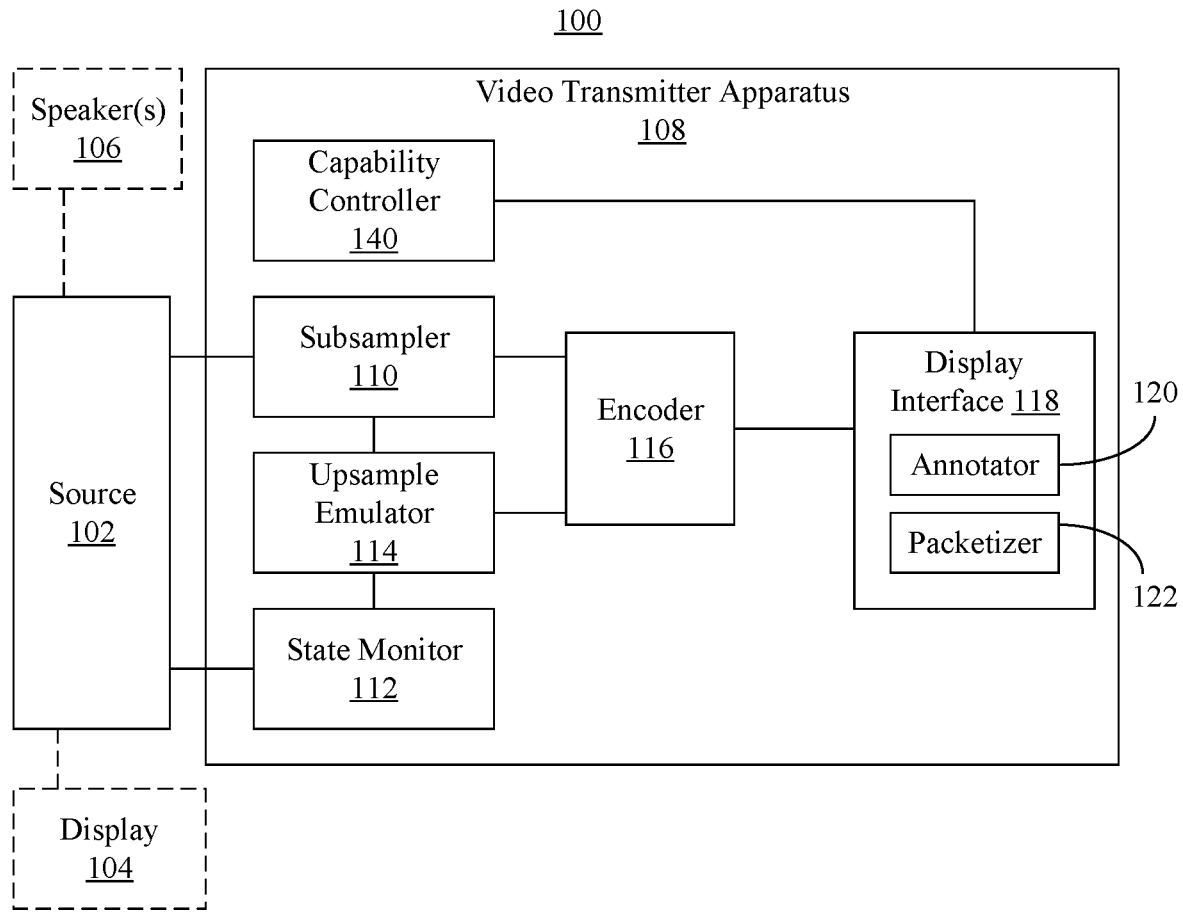
FIG. 2 is a block diagram of an example of a video source system according to an embodiment.

Turning now to FIG. 2, a video source system 100 is shown. In the illustrated example, a source 102 is optionally coupled to a display 104 (e.g., embedded display of a handheld device) and one or more speakers 106 (e.g., hands-free speaker/HFS). The display 104 may present visual content associated with a video signal received from the source 102, which may include, for example, a memory device to store a video signal, a network controller to stream the video signal from a remote server, an application to render the video signal as part of a game and/or browser instance, and so forth. Similarly, the one or more speakers 106 may output sound associated with the video signal.

The video source system 100 may also send the video signal to a wireless display (e.g., wall-mounted monitor, projector, etc., not shown). Accordingly, the illustrated source 102 is also coupled to a video transmitter apparatus 108. The video transmitter apparatus 108 may include a subsampler 110 to generate a primary bitstream based on the video signal, wherein the primary bitstream is encoded with subsampled chroma information (e.g., as well as full resolution luma information). Additionally, a state monitor 112 may detect a static condition with respect to the video signal. The illustrated video transmitter apparatus 108 also includes an upsample emulator 114 communicatively coupled to the state monitor 112 and the subsampler 110, wherein the upsample emulator 114 generates, in response to the static condition, a plurality of auxiliary bitstreams based on the video signal. Each of the plurality of auxiliary bitstreams may be encoded with full resolution chroma information. The state monitor 112 may detect the static condition based on dirty rectangle information associated with the video signal, wherein the dirty rectangle information identifies a static region in one or more frames of the video signal. In such a case, the plurality of auxiliary bitstreams may be restricted to the static region. In addition, the video transmitter apparatus 108 may include a capability controller 140 to exchange auxiliary bitstream capability information with a remote video sink system (not shown).

The video transmitter apparatus 108 may also include an encoder 116, wherein the encoder may be used to generate the primary bitstream and the plurality of auxiliary bitstreams. In one example, the encoder 116, which may be similar to the encoder 14 (FIG. 1), is a 4:2:0 encoder. Additionally, a display interface 118 may transmit the primary bitstream and the plurality of auxiliary bitstreams (e.g., to a video source system containing a wireless display) as 4:2:0 content. In one example, the display interface 118 includes an annotator 120 to mark a first auxiliary bitstream in the plurality of auxiliary bitstreams with a first PID, mark a second auxiliary bitstream in the plurality of auxiliary bitstreams with a second PID and mark the primary bitstream with a third PID, wherein the first, second and third PIDs are different from one another. Moreover, a packetizer 122 may incorporate shared timestamp information into one or more packets including at least a portion of the primary bitstream, the first auxiliary bitstream and the second auxiliary bitstream. The display interface 118 may also include other physical transport components such as an antenna, buffer, radio, and so forth.

Figure 3A:
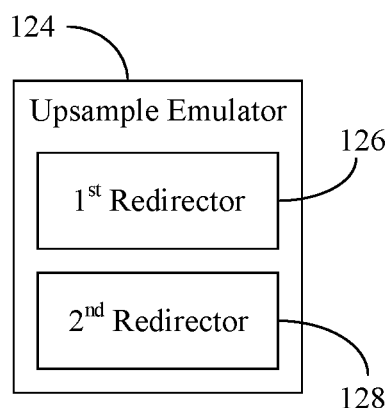
FIGS. 3A and 3B are block diagrams of examples of upsample emulators according to embodiments.
Figure 3B:
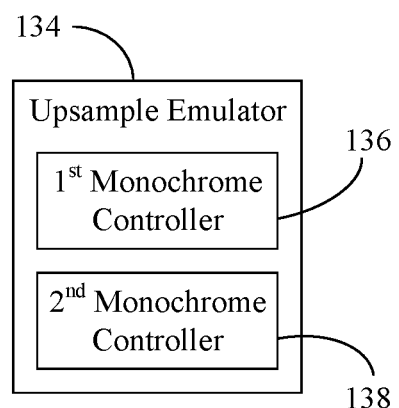

The upsample emulator 114 may be implemented in a number of different ways. For example, FIG. 3A shows an upsample emulator 124 that may be readily substituted for the upsample emulator 114 (FIG. 2). In the illustrated example, a first redirector 126 generates a first pointer to first chroma information (e.g., Cb information) associated with the video signal and processes the first pointer in an encoder such as, for example, the encoder 116 (FIG. 2) as luma information. Additionally, a second redirector 128 may generate a second pointer to second chroma information (e.g., Cr information) associated with the video signal and process the second pointer in the encoder as luma information. FIG. 3B demonstrates that an upsample emulator 134 may alternatively include a first monochrome controller 136 to generate a first monochrome video based on first chroma information (e.g., Cb information) associated with the video signal and process the first monochrome video in an encoder such as, for example, the encoder 116 (FIG. 2) as luma information. Similarly, a second monochrome controller 138 may generate second monochrome video based on second chroma information (e.g., Cr information) associated with the video signal and process the second monochrome video in the encoder.

Figure 4:
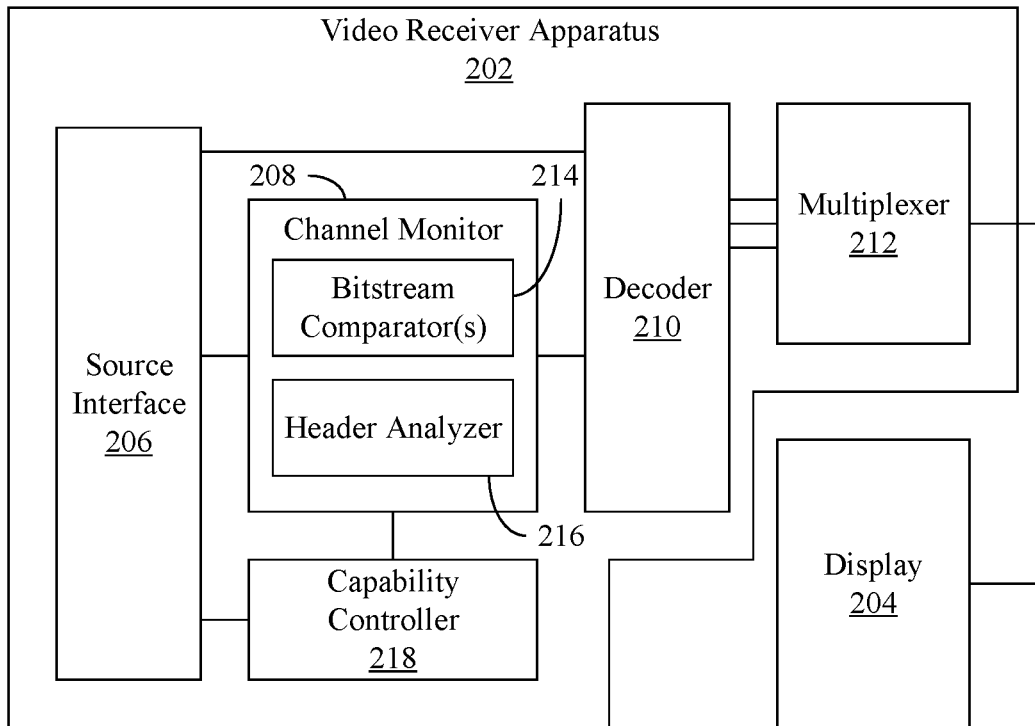
FIG. 4 is a block diagram of an example of a video sink system according to an embodiment.

FIG. 4 shows a video sink system 200 that includes a video receiver apparatus 202 and a display 204 communicatively coupled to the video receiver apparatus 202. The illustrated video receiver apparatus 202 includes a source interface 206 (e.g., antenna) to capture a primary bitstream and a plurality of auxiliary bitstreams. A channel monitor 208 may detect that the plurality of auxiliary bitstreams are associated with the primary bitstream, wherein the primary bitstream is encoded with luma information and subsampled chroma information and each of the plurality of auxiliary bitstreams is encoded with full resolution chroma information. In the illustrated example, a decoder 210 is communicatively coupled to the channel monitor 208. The decoder 210, which may be similar to the decoder 28 (FIG. 1), may decode the primary bitstream and the plurality of auxiliary bitstreams to obtain the luma information and the full resolution chroma information, respectively. Additionally, a multiplexer 212 may be communicatively coupled to the decoder 210, wherein the multiplexer 212 multiplexes the luma information with the full resolution chroma information (e.g., to obtain 4:4:4 content). The display 204 may in turn present visual content associated with the luma information and the full resolution chroma information.

The channel monitor 208 may include one or more bitstream comparators 214 to detect a first PID associated with a first auxiliary bitstream in the plurality of auxiliary bitstreams, detect a second PID associated with a second auxiliary bitstream in the plurality of auxiliary bitstreams, detect a third PID associated with the primary bitstream, and determine that first PID, the second PID and the third PID are different from one another. Additionally, a header analyzer 216 may detect shared timestamp information in one or more packets including at least a portion of the primary bitstream, the first auxiliary bitstream and the second auxiliary bitstream.

In one example, the plurality of auxiliary bitstreams are restricted to a static region in one or more frames of the video signal. More particularly, as certain regions are marked as static (e.g., not dirty), the auxiliary streams are sent to enhance those areas to be 4:4:4. The hardware or software may track which regions have been updated as 4:4:4 and only update the needed static regions. In addition, if there are performance constraints, the performance could take into account which regions get updated within the performance time needed. Accordingly, if an entire frame becomes static and there is only enough performance to update half the frame, the top half might be updated in one frame and the bottom half might be updated in the next frame. With this technique, static regions would quickly be updated to 4:2:0 in order to minimize visual quality artifacts while still meeting performance and bitrate requirements. Such a solution may send an entire frame bitstream with only the applicable coding units coded (e.g., the rest being quickly coded as skip tiles or coding units), and the static areas may be sent as side band information for the auxiliary streams. Another approach would be to send different resolution streams in the auxiliary channel that correspond to the region being updated with the offset in x and y being sent along with it.

Figure 5:
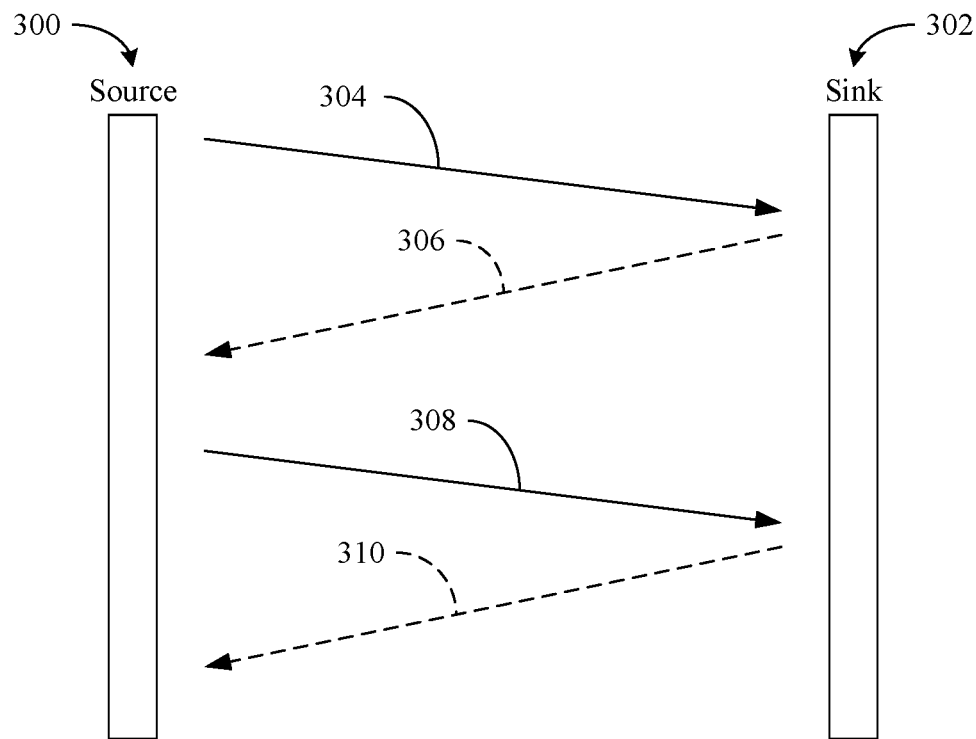
FIG. 5 is a signaling diagram of an example of a capability exchange according to an embodiment.

The illustrated video receiver apparatus 202 may also include a capability controller 218 to exchange auxiliary bitstream capability information with a remote video source system (not shown). In this regard, FIG. 5 shows a signaling diagram of an example of a capability exchange between a source system 300 such as, for example, the video source system 100 (FIG. 2) and a sink system 302 such as, for example, the video sink system 200 (FIG. 4). The capability exchange may generally conduct in accordance with a protocol such as, for example, the Real Time Streaming Protocol (RTSP, Internet Engineering Task Force, April 1998) or other suitable protocol. For example, a new RTSP parameter (e.g., "wfdx_video_auxiliary_streams") might be used in capability negotiation stages of a wireless display session setup sequence. The new RTSP parameter may also be used in a SET_PARAMETER message to dynamically enable or disable the capability due to device policies and management concerns. During the first negotiation stage of the illustrated example, the source system 300 issues a get request 304 to the sink system 302, which returns a response 306. During a second capability negotiation stage, the source system 300 issues a set request 308 to the sink system 302, which returns a response 310. An example syntax definition for the new RTSP parameter is provided below.

wfdx_video_auxiliary_streams="wfdx_video_auxiliary_streams:" SP aux-caps CRLF
="1"/"0"

where "0" indicates no support for video auxiliary streams, and "1" indicates video auxiliary streams will be sent as appropriate, and CRLF is a Carriage Return and Line Feed (e.g., standard syntax as delimiter for the RTSP text based protocol).

Figure 6A:
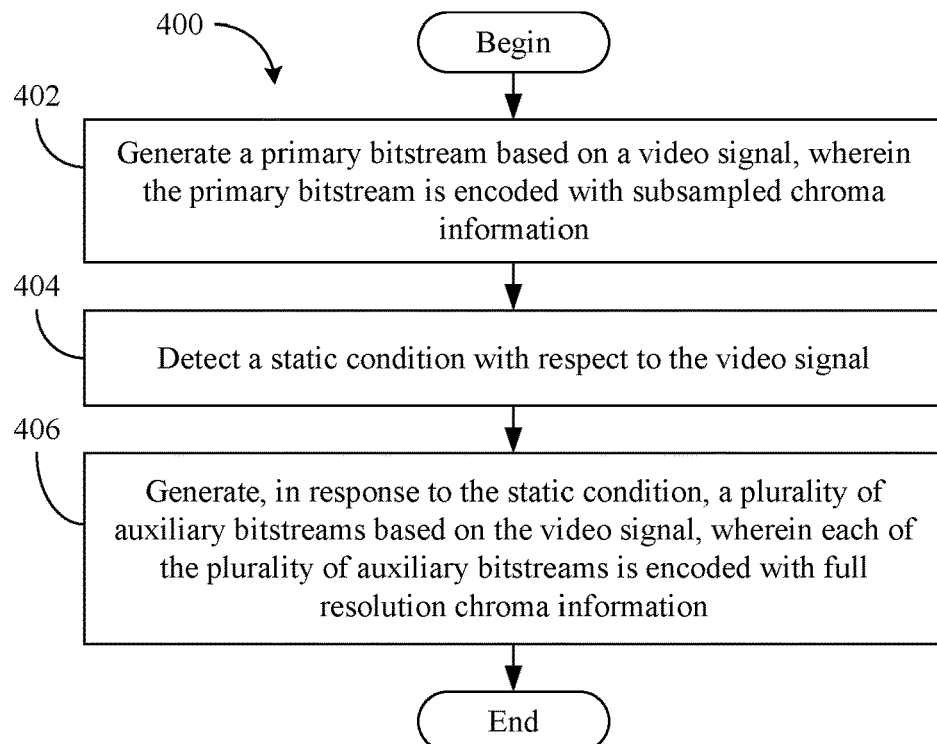
FIG. 6A is a flowchart of an example of a method of operating a video transmitter apparatus according to an embodiment.

Turning now to FIG. 6A, a method 400 of operating a video transmitter apparatus is shown. The method 400 may generally be implemented in a video transmitter apparatus such as, for example, the video transmitter apparatus 108 (FIG. 2), already discussed. More particularly, the method 400 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 402 provides for generating a primary bitstream based on a video signal, wherein the primary bitstream is encoded with subsampled chroma information. A static condition may be detected at block 404 with respect to the video signal. Block 404 may include detecting the static condition based on dirty rectangle information associated with the video signal. The dirty rectangle information may identify, for example, a static region (e.g., pixel subset) in one or more frames of the video signal. Block 404 may also receive feedback from the operating system (OS) indicating which regions are static. In another example, a comparison of the frames may be conducted (e.g., in a display engine or other hardware, with or without hashing) to determine whether frames or sections of frames are the same. Moreover, block 404 might detect the absence of interrupts (e.g., typing, mouse movement, plane flips). Additionally, the static condition may be detected with respect to part of a frame or an entire frame. In yet another example, block 404 may determine the original surface types for the output surface. For example, if a large percentage of the final output plane was initially encoded 4:2:0, using 4:4:4 coding may not be justified even if the plane was static or mostly static (e.g., movie credits).

Illustrated block 406 generates, in response to the static condition, a plurality of auxiliary bitstreams based on the video signal, wherein each of the plurality of auxiliary bitstreams is encoded with full resolution chroma information. In one example, a 4:2:0 encoder is used to generate the primary bitstream and the plurality of auxiliary bitstreams, wherein the primary bitstream and the plurality of auxiliary bitstreams are transmitted as 4:4:4 content. When a static region has been identified (e.g., rather than an entire static frame), the auxiliary bitstreams may be restricted to the static region. The auxiliary bitstreams may also be generated based on resource management considerations. For example, the auxiliary bitstreams might be generated if more encode hardware is available and the system is unconstrained.

Figure 6B:
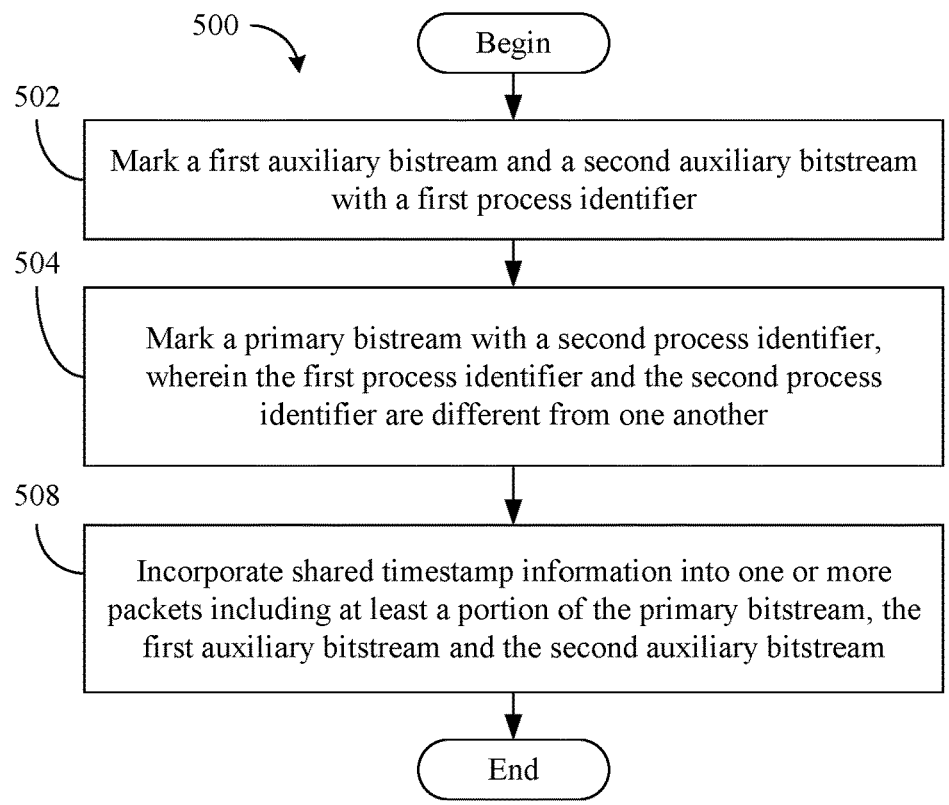
FIG. 6B is a flowchart of an example of a method of signaling an auxiliary bitstream switch according to an embodiment.

FIG. 6B shows a method 500 of signaling an auxiliary bitstream switch. The method 500 may generally be implemented in a video transmitter apparatus such as, for example, the video transmitter apparatus 108 (FIG. 2), already discussed. More particularly, the method 500 may be implemented as one or more modules in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 marks a first auxiliary bitstream and a second auxiliary bitstream with a first PID. Additionally, the primary bitstream may be marked at block 506 with a second PID, wherein the first and second PIDs are different from one another. Thus, the auxiliary bitstreams may be managed independently from the primary bitstream.

For example, the first auxiliary bitstream might be signaled in a PMT message as follows:

Stream type—any value between 0x80-0xFF (user private)

elementary_PID in PMT to indicate PID for video stream: 0x10 11

The second auxiliary bitstream may be signaled in a PMT message as follows:

Stream type—another value between 0x80-0xFF (user private)

elementary_PID in PMT to indicate PID for video stream: 0x10 11

The PMT messages may be sent from the source within a maximum interval of, for example, 100 ms. When the encoder produces the auxiliary streams—and before they are multiplexed into the transport stream—a new PMT message may be sent to indicate the stream type and PID details. Additionally, a new PMT message may be sent when the encoder stops generating auxiliary streams.

Illustrated block 508 incorporates shared timestamp information into one or more packets including at least a portion of the primary bitstream, the first auxiliary bitstream and the second auxiliary bitstream. In this regard, a packetized elementary stream (PES) header for all three streams may include the same presentation timestamp (PTS). In addition, for high-bandwidth digital content protection (HDCP) transport streams, the PES private data in the PES header may be applied to the auxiliary streams. For example, the same cryptographic function stream counter (StreamCtr) may be used in all three streams by both the transmitter and the receiver to maintain security. Moreover, an HDCP stream manager message from the transmitter may set the type-0 or type-1 to signal the protection level using the stream type declared in the PMT message and PES packet.

Figure 7:
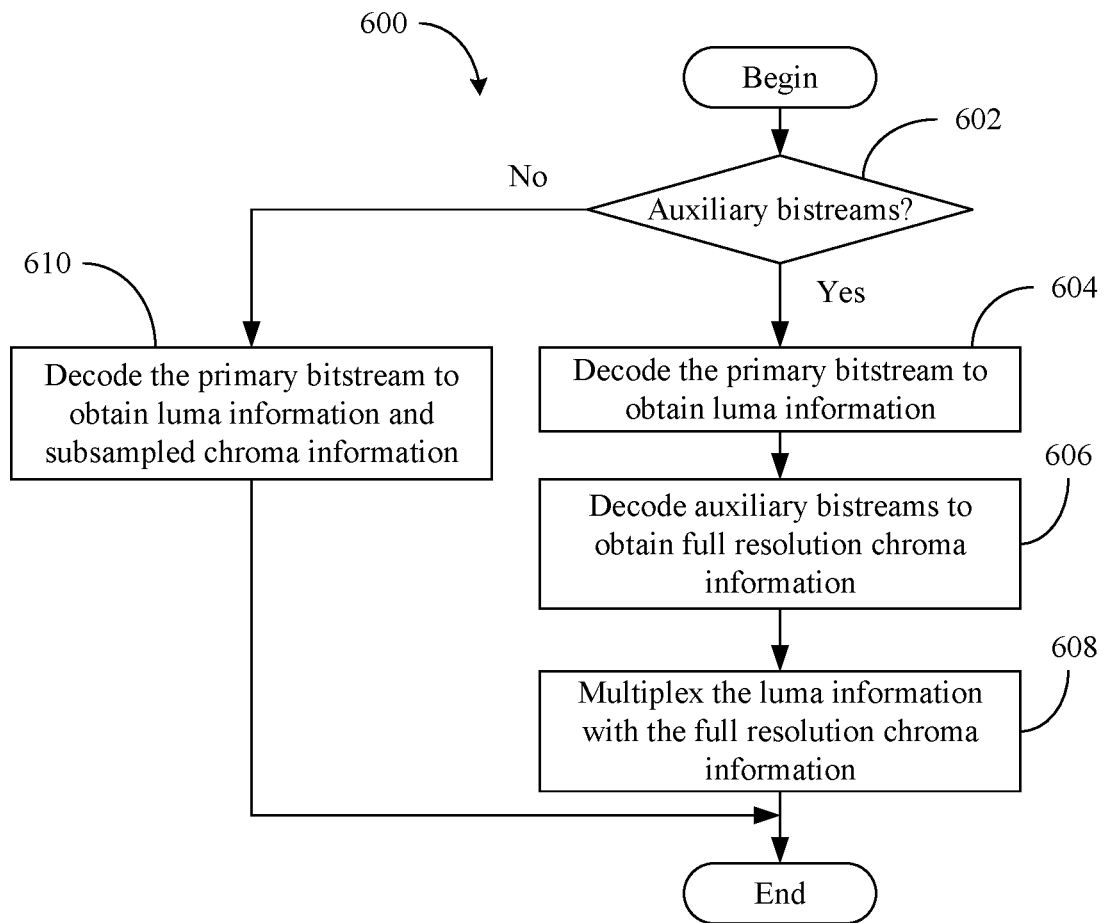
FIG. 7 is a flowchart of an example of a method of operating a video receiver apparatus according to an embodiment.

Turning now to FIG. 7, a method 600 of operating a video receiver apparatus is shown. The method 600 may generally be implemented in a video receiver apparatus such as, for example, the video transmitter apparatus 202 (FIG. 4), already discussed. More particularly, the method 600 may be implemented as one or more modules in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 602 determines whether a plurality of auxiliary bitstreams are associated with a primary bitstream. Block 602 may include, for example, detecting a first PID associated with a first auxiliary bitstream, detecting a second PID associated with a second auxiliary bitstream, detecting a third PID associated with the primary bitstream, and determining whether the first, second and third PIDs are different from one another. If so, block 602 may also include determining whether shared timestamp information has been incorporated into one or more packets including at least a portion of the primary bitstream, the first auxiliary bitstream and the second auxiliary bitstream.

If the shared timestamp information is detected for the three different streams, illustrated block 604 decodes the primary bitstream to obtain full resolution luma information. Block 604 may also include discarding subsampled chroma information in the primary bitstream. Additionally, the auxiliary bitstreams may be decoded at block 606 to obtain full resolution chroma information. Block 606 may include discarding constant value surfaces in the auxiliary bitstreams. Illustrated block 608 provides for multiplexing the luma information with the full resolution chroma information (e.g., to obtain 4:4:4 content. If it is determined at block 602 that a plurality of auxiliary bitstreams are not associated with a primary bitstream, block 610 may decode the primary bitstream to obtain luma information and subsampled chroma information.

Figure 8:
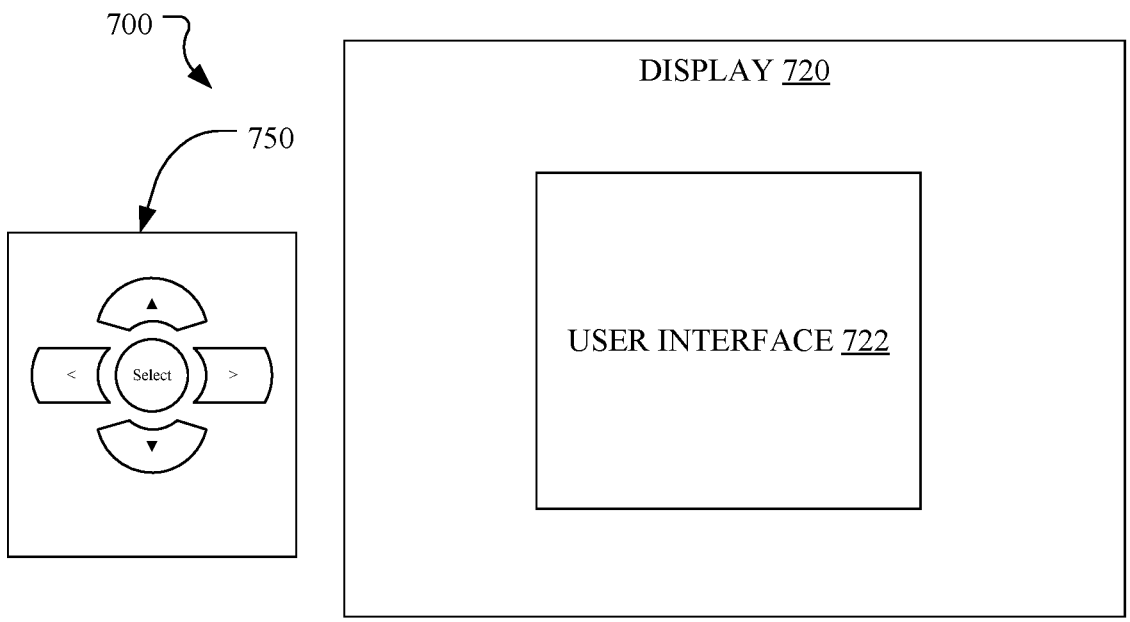
FIG. 8 is a block diagram of an example of a system having a navigation controller according to an embodiment.
Figure 8:
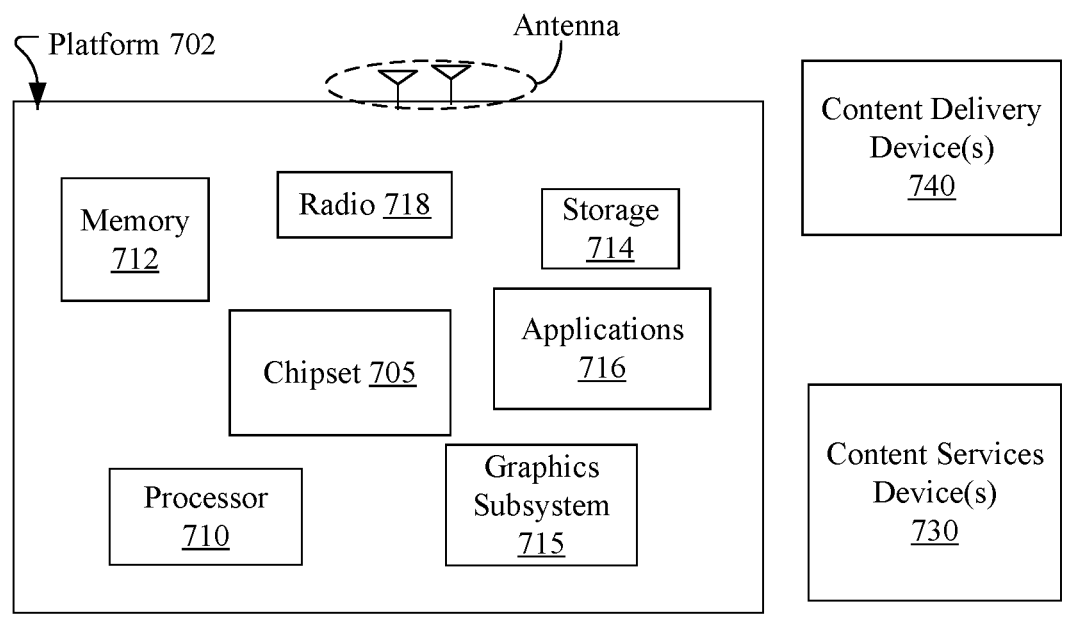
Figure 8:
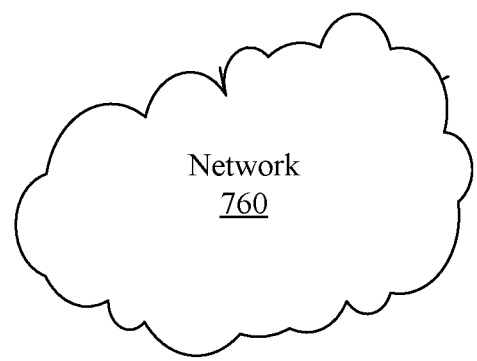

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 includes a platform 702 coupled to a display 720 that presents visual content. The platform 702 may receive video bitstream content from a content device such as content services device(s) 730 or content delivery device(s) 740 or other similar content sources. A navigation controller 750 including one or more navigation features may be used to interact with, for example, platform 702 and/or display 720. Each of these components is described in more detail below.

In embodiments, the platform 702 may include any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may include dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may include technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface, DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a video transmitter apparatus and/or a video receiver apparatus as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may include any television type monitor or display. The display 720 may include, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may include technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of an wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
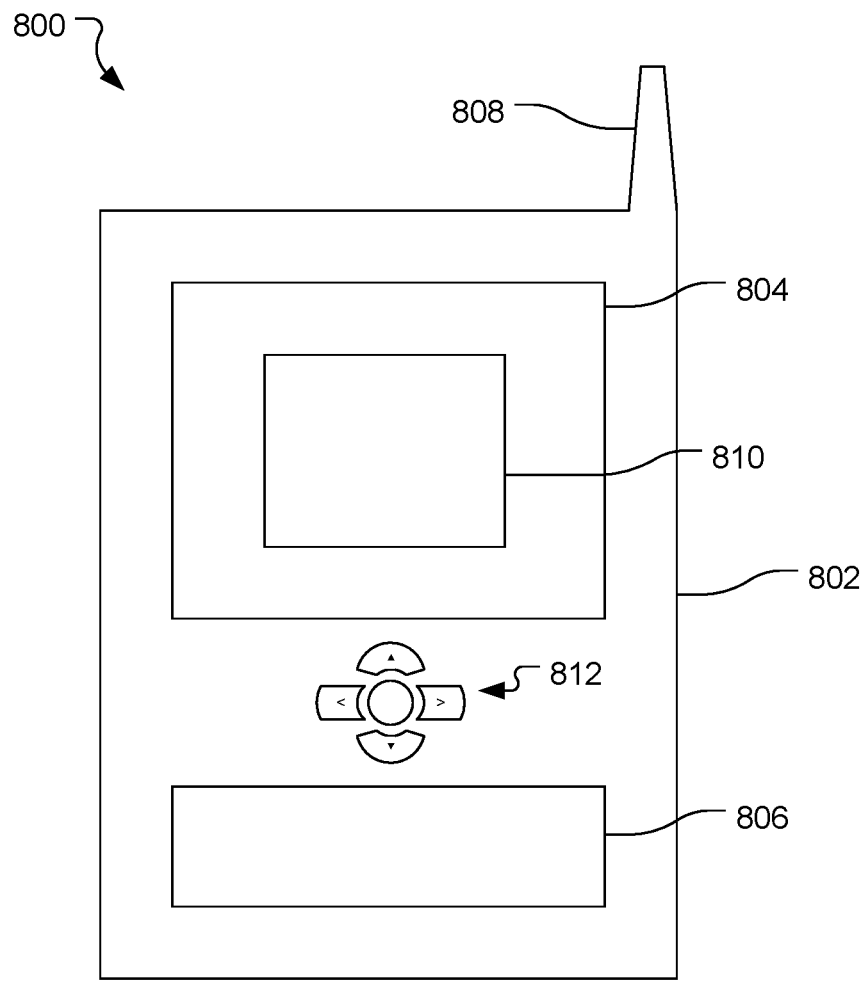
FIG. 9 is a block diagram of an example of a system having a small form factor according to an embodiment.

As described above, the system 700 may be embodied in varying physical styles or form factors. FIG. 9 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, the device 800 may include a housing 802, a display 804, an input/output (I/O) device 806, and an antenna 808. The device 800 also may include navigation features 812. The display 804 may include any suitable display unit for displaying information appropriate for a mobile computing device. The I/O device 806 may include any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

ADDITIONAL NOTES AND EXAMPLES

Example 1 may include a video transmitter apparatus including a subsampler to generate a primary bitstream based on a video signal, wherein the primary bitstream is to be encoded with subsampled chroma information, a state monitor to detect a static condition with respect to the video signal, and an upsample emulator communicatively coupled to the state monitor and the subsampler, the upsample emulator to generate, in response to the static condition, a plurality of auxiliary bitstreams based on the video signal, wherein each of the plurality of bitstreams is to be encoded with full resolution chroma information.

Example 2 may include the apparatus of example 1, further including a 4:2:0 encoder, wherein the 4:2:0 encoder is to be used to generate the primary bitstream and the plurality of auxiliary bitstreams, and a display interface to transmit the primary bitstream and the plurality of auxiliary bitstreams as 4:4:4 content.

Example 3 may include the apparatus of example 1, further including an annotator to mark a first auxiliary bitstream and a second auxiliary bitstream in the plurality of bitstreams with a first process identifier, and mark the primary bitstream with a second process identifier, wherein the first process identifier and the second process identifier are to be different from one another, and a packetizer to incorporate shared timestamp information into one or more packets including at least a portion of the primary bitstream, the first auxiliary bitstream and the second auxiliary bitstream.

Example 4 may include the apparatus of example 1, wherein the upsample emulator includes a first redirector to generate a first pointer to first chroma information associated with the video signal and process the first pointer in an encoder as luma information, and a second redirector to generate a second pointer to second chroma information associated with the video signal and process the second pointer in the encoder as the luma information.

Example 5 may include the apparatus of example 1, wherein the upsample emulator includes a first monochrome controller to generate a first monochrome video based on first chroma information associated with the video signal and process the first monochrome video in an encoder, and a second monochrome controller to generate a second monochrome video based on second chroma information associated with the video signal and process the second monochrome video in the encoder.

Example 6 may include the apparatus of example 1, wherein the static condition is to be detected based on dirty rectangle information associated with the video signal, the dirty rectangle information is to identify a static region in one or more frames of the video signal, and the plurality of auxiliary bitstreams are to be restricted to the static region.

Example 7 may include the apparatus of any one of examples 1 to 6, further including a capability controller to exchange auxiliary bitstream capability information with a remote video sink system.

Example 9 may include at least one computer readable storage medium comprising a set of instructions, which when executed by a video transmitter, cause the video transmitter to generate a primary bitstream based on a video signal, wherein the primary bitstream is encoded with subsampled chroma information, detect a static condition with respect to the video signal, and generate, in response to the static condition, a plurality of auxiliary bitstreams based on the video signal, wherein each of the plurality of auxiliary bitstreams is to be encoded with full resolution chroma information.

Example 9 may include the at least one computer readable storage medium of example 8, wherein a 4:2:0 encoder is to be used to generate the primary bitstream and the plurality of auxiliary bitstreams, and wherein the instructions, when executed, cause the video transmitter to transmit the primary bitstream and the plurality of auxiliary bitstreams as 4:4:4 content.

Example 10 may include the at least one computer readable storage medium of example 8, wherein the instructions, when executed, cause the video transmitter to mark a first auxiliary bitstream and a second auxiliary bitstream in the plurality of auxiliary bitstreams with a first process identifier, mark the primary bitstream with a second process identifier, wherein the first process identifier and the second process identifier are to be different from one another, and incorporate shared timestamp information into one or more packets including at least a portion of the primary bitstream, the first auxiliary bitstream and the second auxiliary bitstream.

Example 11 may include the at least one computer readable storage medium of example 8, wherein the instructions, when executed, cause the video transmitter to generate a first pointer to first chroma information associated with the video signal, process the first pointer in an encoder as luma information, generate a second pointer to second chroma information associated with the video signal, and process the second pointer in the encoder as the luma information.

Example 12 may include the at least one computer readable storage medium of example 8, the instructions, when executed, cause the video transmitter to generate a first monochrome video based on first chroma information associated with the video signal, process the first monochrome video in an encoder, generate a second monochrome video based on second chroma information associated with the video signal, and process the second monochrome video in the encoder.

Example 13 may include the at least one computer readable storage medium of example 8, wherein the static condition is to be detected based on dirty rectangle information associated with the video signal, the dirty rectangle information is to identify a static region in one or more frames of the video signal, and the plurality of auxiliary bitstreams are to be restricted to the static region.

Example 14 may include the at least one computer readable storage medium of any one of examples 8 to 13, wherein the instructions, when executed, cause the video transmitter to exchange auxiliary bitstream capability information with a remote video sink system.

Example 15 may include a video receiver apparatus including a channel monitor to detect that a plurality of auxiliary bitstreams are associated with a primary bitstream, wherein the primary bitstream is to be encoded with luma information and subsampled chroma information and each of the plurality of auxiliary bitstreams is to be encoded with full resolution chroma information, a decoder communicatively coupled to the channel monitor, the decoder to decode the primary bitstream and the plurality of auxiliary bitstreams to obtain the luma information and the full resolution chroma information, and a multiplexer communicatively coupled to the decoder, the multiplexer to multiplex the luma information with the full resolution chroma information.

Example 16 may include the apparatus of example 15, wherein the decoder is a 4:2:0 decoder and the luma information is to be multiplexed with the full resolution chroma information to obtain 4:4:4 content.

Example 17 may include the apparatus of example 15, wherein the channel monitor includes one or more bitstream comparators to detect a first process identifier associated with a first auxiliary bitstream and a second auxiliary bitstream in the plurality of auxiliary bistream, and detect a second process identifier associated with the primary bitstream, and a header analyzer to detect shared timestamp information in one or more packets including at least a portion of the primary bitstream, the first auxiliary bitstream and the second auxiliary bitstream.

Example 18 may include the apparatus of example 15, wherein the plurality of auxiliary bitstreams are to be restricted to a static region in one or more frames of a video signal.

Example 19 may include the apparatus of any one of examples 15 to 18, further including a capability controller to exchange auxiliary bitstream capability information with a remote video source system.

Example 20 may include at least one computer readable storage medium including a set of instructions, which when executed by a video receiver, cause the video receiver to detect that a plurality of auxiliary bitstreams are associated with a primary bitstream, wherein the primary bitstream is to be encoded with luma information and subsampled chroma information and each of the plurality of auxiliary bitstreams is to be encoded with full resolution chroma information, decode the primary bitstream and the plurality of auxiliary bitstreams to obtain the luma information and the full resolution chroma information, and multiplex the luma information with the full resolution chroma information.

Example 21 may include the at least one computer readable storage medium of example 20, wherein a 4:2:0 encoder is to be used to decode the primary bitstream and the plurality of auxiliary bitstreams, and wherein the luma information is to be multiplexed with the full resolution chroma information to obtain 4:4:4 content.

Example 22 may include the at least one computer readable storage medium of example 20, wherein the instructions, when executed, cause the video receiver to detect a first process identifier associated with a first auxiliary bitstream and a second auxiliary bitstream in the plurality of auxiliary bistream, detect a second process identifier associated with the primary bitstream, and detect shared timestamp information in one or more packets including at least a portion of the primary bitstream, the first auxiliary bitstream and the second auxiliary bitstream.

Example 23 may include the at least one computer readable storage medium of example 20, wherein the plurality of auxiliary bitstreams are to be restricted to a static region in one or more frames of a video signal.

Example 24 may include the at least one computer readable storage medium of any one of examples 20 to 23, wherein the instructions, when executed, cause the video receiver to exchange auxiliary bitstream capability information with a remote video source system.

Example 25 may include a video source system including a memory device to store a video signal, an embedded display to present visual content associated with the video signal, one or more speakers to output sound associated with the video signal, and a video transmitter apparatus including a subsampler to generate a primary bitstream based on a video signal, wherein the primary bitstream is to be encoded with subsampled chroma information, a state monitor to detect a static condition with respect to the video signal, and an upsample emulator communicatively coupled to the state monitor and the subsampler, the upsample emulator to generate, in response to the static condition, a plurality of auxiliary bitstreams based on the video signal, wherein each of the plurality of auxiliary bitstreams is to be encoded with full resolution chroma information.

Example 26 may include the system of example 25, wherein the video transmitter apparatus further includes a 4:2:0 encoder, wherein the 4:2:0 encoder is to be used to generate the primary bitstream and the plurality of auxiliary bitstreams, and a display interface to transmit the primary bitstream and the plurality of auxiliary bitstreams as 4:4:4 content.

Example 27 may include the system of example 25, wherein the video transmitter apparatus further includes: an annotator to mark a first auxiliary bitstream and a second auxiliary bitstream in the plurality of bitstreams with a first process identifier, and mark the primary bitstream with a second process identifier, wherein the first process identifier and the second process identifier are to be different from one another, and a packetizer to incorporate shared timestamp information into one or more packets including at least a portion of the primary bitstream, the first auxiliary bitstream and the second auxiliary bitstream.

Example 28 may include the system of example 25, wherein the upsample emulator includes a first redirector to generate a first pointer to first chroma information associated with the video signal and process the first pointer in an encoder as luma information, and a second redirector to generate a second pointer to second chroma information associated with the video signal and process the second pointer in the encoder as the luma information.

Example 29 may include the system of example 25, wherein the upsample emulator includes a first monochrome controller to generate a first monochrome video based on first chroma information associated with the video signal and process the first monochrome video in an encoder, and a second monochrome controller to generate a second monochrome video based on second chroma information associated with the video signal and process the second monochrome video in the encoder.

Example 30 may include the system of example 25, wherein the static condition is to be detected based on dirty rectangle information associated with the video signal, the dirty rectangle information is to identify a static region in one or more frames of the video signal, and the plurality of auxiliary bitstreams are to be restricted to the static region.

Example 31 may include the system of any one of examples 25 to 30, wherein the video transmitter apparatus further includes capability controller to exchange auxiliary bitstream capability information with a remote video sink system.

Example 32 may include a method of operating a video transmitter apparatus, including generating a primary bitstream based on a video signal, wherein the primary bitstream is encoded with subsampled chroma information, detecting a static condition with respect to the video signal, and generating, in response to the static condition, a plurality of auxiliary bitstreams based on the video signal, wherein each of the plurality of auxiliary bitstreams is encoded with full resolution chroma information.

Example 33 may include the method of example 32, wherein a 4:2:0 encoder is used to generate the primary bitstream and the plurality of auxiliary bitstreams, the method further including transmitting the primary bitstream and the plurality of auxiliary bitstreams as 4:4:4 content.

Example 34 may include the method of example 32, further including marking a first auxiliary bitstream a second auxiliary bitstream in the plurality of auxiliary bitstreams with a first process identifier, marking the primary bitstream with a second process identifier, wherein the first process identifier and the second process identifier are different from one another, and incorporating shared timestamp information into one or more packets including at least a portion of the primary bitstream, the first auxiliary bitstream and the second auxiliary bitstream.

Example 35 may include the method of example 32, wherein generating the plurality of auxiliary bitstreams includes generating a first pointer to first chroma information associated with the video signal, processing the first pointer in an encoder as luma information, generating a second pointer to second chroma information associated with the video signal, and processing the second pointer in the encoder as the luma information.

Example 36 may include the method of example 32, wherein generating the plurality of auxiliary bitstreams includes generating a first monochrome video based on first chroma information associated with the video signal, processing the first monochrome video in an encoder, generating a second monochrome video based on second chroma information associated with the video signal, and processing the second monochrome video in the encoder.

Example 37 may include the method of example 32, wherein the static condition is detected based on dirty rectangle information associated with the video signal, the dirty rectangle information identifies a static region in one or more frames of the video signal, and the plurality of auxiliary bitstreams are restricted to the static region.

Example 38 may include the method of any one of examples 32 to 37, further including exchanging auxiliary bitstream capability information with a remote video sink system.

Example 39 may include a video sink system includes an antenna to capture a primary bitstream and a plurality of auxiliary bitstreams, a video receiver apparatus including a channel monitor to detect that the plurality of auxiliary bitstreams are associated with the primary bitstream, wherein the primary bitstream is to be encoded with luma information and subsampled chroma information and each of the plurality of auxiliary bitstreams is to be encoded with full resolution chroma information, a decoder communicatively coupled to the channel monitor, the decoder to decode the primary bitstream and the plurality of auxiliary bitstreams to obtain the luma information and the full resolution chroma information, and a multiplexer communicatively coupled to the decoder, the multiplexer to multiplex the luma information with the full resolution chroma information, and a display to present visual content associated with the luma information and the full resolution chroma information.

Example 40 may include the video sink system of example 39, wherein the decoder is a 4:2:0 decoder and the luma information is to be multiplexed with the full resolution chroma information to obtain 4:4:4 content.

Example 41 may include the video sink system of example 39, wherein the channel monitor includes one or more bitstream comparators to detect a first process identifier associated with a first auxiliary bitstream and a second auxiliary bitstream in the plurality of auxiliary bitstream, and detect a second process identifier associated with the primary bitstream, and a header analyzer to detect shared timestamp information in one or more packets including at least a portion of the primary bitstream, the first auxiliary bitstream and the second auxiliary bitstream.

Example 42 may include the video sink system of example 39, wherein the plurality of auxiliary bitstreams are to be restricted to a static region in one or more frames of a video signal.

Example 43 may include the video sink system of any one of examples 39 to 42, wherein the video receiver apparatus further includes a capability controller to exchange auxiliary bitstream capability information with a remote video source system.

Example 44 may include a method of operating a video receiver, including detecting that a plurality of auxiliary bitstreams are associated with a primary bitstream, wherein the primary bitstream is encoded with luma information and subsampled chroma information and each of the plurality of auxiliary bitstreams is encoded with full resolution chroma information, decoding the primary bitstream and the plurality of auxiliary bitstreams to obtain the luma information and the full resolution chroma information, and multiplexing the luma information with the full resolution chroma information.

Example 45 may include the method of example 44, wherein a 4:2:0 encoder is used to decode the primary bitstream and the plurality of auxiliary bitstreams, and wherein the luma information is multiplexed with the full resolution chroma information to obtain 4:4:4 content.

Example 46 may include the method of example 44, wherein detecting that the plurality of auxiliary bitstreams are associated with the primary bitstream includes detecting a first process identifier associated with a first auxiliary bitstream and a second auxiliary bitstream in the plurality of auxiliary bitstreams, detecting a second process identifier associated with the primary bitstream, and, detecting shared timestamp information in one or more packets including at least a portion of the primary bitstream, the first auxiliary bitstream and the second auxiliary bitstream.

Example 47 may include the method of example 44, wherein the plurality of auxiliary bitstreams are restricted to a static region in one or more frames of a video signal.

Example 48 may include the method of any one of examples 44 to 47, further including exchanging auxiliary bitstream capability information with a remote video source system.

Example 49 may include a video transmitter apparatus including means for performing the method of any one of examples 32 to 37.

Example 50 may include a video receiver apparatus including means for performing the method of any one of examples 44 to 47.

Techniques described herein may therefore use extra encoding headroom resulting from static conditions to create auxiliary bitstreams. The auxiliary bitstreams may in turn achieve switchable chroma sampling without stopping the video stream and starting a new video stream. Moreover, 4:4:4 quality video may be obtained without native 4:4:4 hardware support.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. At least one memory comprising instructions, which when executed, cause an electronic device to:
    generate a first bitstream based on a video signal, the first bitstream is encoded with full resolution luma information and subsampled chroma information;
    detect a static condition with respect to the video signal;
    generate, in response to the static condition and based on the video signal, (i) a second bitstream that includes first full resolution chroma information and first constant value surfaces, and (ii) a third bitstream that includes second full resolution chroma information and second constant value surfaces; and
    cause transmission of the first bitstream, the second bitstream, and the third bitstream to a receiver, to cause the receiver to reconstruct the video signal using the full resolution luma information and first and second full resolution chroma information, and to further cause the receiver to discard the first and second constant value surfaces while reconstructing the video signal.

2. The at least one memory of claim 1, wherein the instructions cause the electronic device to:
    mark the first bitstream with a first identifier;
    mark the second bitstream with a second identifier; and
    mark the third bitstream with a third identifier,
    wherein the first, second, and third identifiers indicate that the second and third bitstreams are associated with the first bitstream.

3. The at least one memory of claim 1, wherein the instructions cause the electronic device to:
    mark the first bitstream with a first identifier;
    mark the second bitstream with a second identifier; and
    mark the third bitstream with a third identifier,
    wherein the first, second, and third identifiers indicate that the first bitstream, the second bitstream, and the third bitstream, respectively, include the full resolution luma information, the first full resolution chroma information, and the second full resolution chroma information.

4. The at least one memory of claim 1, wherein the instructions cause the electronic device to:
    associate the first bitstream, the second bitstream, and the third bitstream with a shared timestamp, the shared timestamp indicating that the second and third bitstreams are associated with the first bitstream.

5. The at least one memory of claim 1, wherein the instructions cause the electronic device to:
cause transmission of at least one of a program map table (PMT) message or a program association table (PAT) message, the at least one of the PMT message or the PAT message indicative of an association of the second and third bitstreams with the first bitstream.

6. The at least one memory of claim 1, wherein the receiver is to discard the subsampled chroma information while reconstructing the video signal.

7. The at least one memory of claim 1, wherein the instructions cause the detection of the static condition based on dirty rectangle information associated with the video signal, the dirty rectangle information identifying a static region in one or more frames of the video signal, and wherein the first, second, and third bitstreams are restricted to the static region.

8. The at least one memory of claim 1, wherein the instructions cause the electronic device to:
generate each of the first bitstream, the second bitstream, and the third bitstream using 4:2:0 encoding.

9. The at least one memory of claim 1, wherein the instructions cause the electronic device to:
cause transmission of the first bitstream, the second bitstream, and the third bitstream as 4:4:4 content.

10. The at least one memory of claim 1, wherein the instructions cause the electronic device to:
detect an end of the static condition with respect to the video signal; and
in response to detecting the end of the static condition, refrain from generating the second bitstream and the third bitstream.

11. At least one memory comprising instructions, which when executed, cause an electronic system to:
receive a first bitstream that includes first information and second information;
receive a second bitstream that includes third information and fourth information;
receive a third bitstream that includes fifth information and sixth information, the first bitstream, the second bitstream, and the third bitstream being a primary bitstream, a first auxiliary bitstream, and a second auxiliary bitstream, respectively, the first bitstream, the second bitstream, and the third bitstream associated with a plurality of static video frames;
receive an indication of association between the first bitstream, the second bitstream, and the third bitstream; and
reconstruct a video signal, with the first information being used as full resolution luma information, the third information being used as full resolution first chroma information, and the fifth information being used as full resolution second chroma information.

12. The at least one memory of claim 11, wherein the instructions cause the electronic system to:
discard, when reconstructing the video signal, the second information, the fourth information, and the sixth information.

13. The at least one memory of claim 11, wherein the second information includes subsampled chroma information.

14. The at least one memory of claim 11, wherein the fourth and sixth information include constant value surfaces.

15. The at least one memory of claim 11, wherein to receive the indication of association between the first bitstream, the second bitstream, and the third bitstream, the instructions cause the electronic system to at least one of:
(i) receive a first identifier for the first bitstream, a second identifier for the second bitstream, and a third identifier for the third bitstream, wherein the first, second, and third identifiers provide the indication of the association between the first bitstream, the second bitstream, and the third bitstream;
(ii) receive a timestamp that is shared among the first bitstream, the second bitstream, and the third bitstream, the shared timestamp to provide the indication of the association between the first bitstream, the second bitstream, and the third bitstream; or
(iii) receive at least one of a program map table (PMT) message or a program association table (PAT) message, the at least one of the PMT message or the PAT message provide the indication of the association between the first bitstream, the second bitstream, and the third bitstream.

16. A method for encoding bitstreams for a video signal, the method comprising:
receiving luma information, first chroma information, and second chroma information of a video signal;
detecting a static condition with respect to the video signal;
in response to the static condition, encoding (i) the luma information and subsampled versions of the first and second chroma information within a primary bitstream, (ii) the first chroma information and one or more first constant value surfaces within a first auxiliary bitstream, and (iii) the second chroma information and one or more second constant value surfaces within a second auxiliary bitstream; and
causing transmission of the primary bitstream, the first auxiliary bitstream, and the second auxiliary bitstream.

17. The method of claim 16, further including:
causing transmission of an indication of an association between the primary bitstream, the first auxiliary bitstream, and the second auxiliary bitstream, the indication to facilitate reconstruction of the video signal using the luma information and first and second chroma information, while discarding (i) the subsampled versions of the first and second chroma information and (ii) the one or more first and second constant value surfaces.

18. The method of claim 17, wherein the indication is in the form of one or more identifiers associated with each of the primary, first auxiliary, and second auxiliary bitstreams, and/or in the form of a timestamp shared between the primary, first auxiliary, and second auxiliary bitstreams.

19. The method of claim 16, further including:
detecting an end of the static condition; and
in response to detecting the end of the static condition, refraining from generating the first auxiliary bitstream and the second auxiliary bitstream.

* * * * *